United States Patent
Winkel

(10) Patent No.: US 8,229,634 B2
(45) Date of Patent: *Jul. 24, 2012

(54) METHOD FOR CONTROLLING AN AUTOMATIC MULTI-STEP SHIFT TRANSMISSION

(75) Inventor: Matthias Winkel, Sorocaba (BR)

(73) Assignee: ZF Friedrichshafen AG, Friedrichshafen (DE)

( * ) Notice: Subject to any disclaimer, the term of this patent is extended or adjusted under 35 U.S.C. 154(b) by 315 days.

This patent is subject to a terminal disclaimer.

(21) Appl. No.: 12/676,658

(22) PCT Filed: Sep. 11, 2008

(86) PCT No.: PCT/EP2008/062010
§ 371 (c)(1),
(2), (4) Date: Mar. 5, 2010

(87) PCT Pub. No.: WO2009/037167
PCT Pub. Date: Mar. 26, 2009

(65) Prior Publication Data
US 2010/0324793 A1    Dec. 23, 2010

(30) Foreign Application Priority Data
Sep. 18, 2007 (DE) .......................... 10 2007 044 432

(51) Int. Cl.
G06F 7/00 (2006.01)
G06F 17/00 (2006.01)
G06F 19/00 (2011.01)

(52) U.S. Cl. ........................................... 701/58; 701/65

(58) Field of Classification Search ............... 477/34, 477/92, 94–96, 115, 118–120, 901; 701/51, 701/53, 54, 58, 65, 94, 95
See application file for complete search history.

(56) References Cited

U.S. PATENT DOCUMENTS

| 4,354,236 A * | 10/1982 | Miki et al. ........... 701/66 |
| 4,393,467 A * | 7/1983 | Miki et al. ........... 701/66 |
| 4,648,291 A | 3/1987 | Klatt et al. |
| 4,713,764 A * | 12/1987 | Klatt .................. 701/65 |
| 4,982,805 A * | 1/1991 | Naitou et al. ........ 180/179 |
| 5,231,897 A | 8/1993 | Morita |
| 5,803,865 A | 9/1998 | Harada et al. |
| 5,816,979 A * | 10/1998 | Shiiba et al. ......... 477/176 |
| 5,868,214 A * | 2/1999 | Workman ............. 180/179 |

(Continued)

FOREIGN PATENT DOCUMENTS
DE     33 34 718 A1     4/1985
(Continued)

Primary Examiner — Paul N Dickson
Assistant Examiner — Laura Freedman
(74) Attorney, Agent, or Firm — Davis & Bujold, P.L.L.C.

(57) ABSTRACT

A method of controlling an automatic transmission of a motor vehicle that is situated in the force flow between a drive motor and an axle drive of a drive axle or a transfer box in which the current road inclination ($\alpha_{FB}$) is determined. To improve the shifting behavior of the transmission, during a transition between driving on a downhill stretch (2) and on level ground (4), after driving on the downhill stretch (2) and/or after the transition to a thrust operation, a recognition function for determining a downhill run-out (3) is initiated and, when the downhill run-out (3) is recognized, a shift to a higher gear during a thrust operation, i.e., a thrust upshift, is carried out before driving onto level ground (4) and/or before the transition to the traction operation.

14 Claims, 1 Drawing Sheet

U.S. PATENT DOCUMENTS

| | | | |
|---|---|---|---|
| 6,098,002 A | 8/2000 | Horiguchi et al. | |
| 8,165,764 B2 * | 4/2012 | Wolfgang et al. | 701/58 |
| 2008/0167161 A1 * | 7/2008 | Mitchell et al. | 477/94 |
| 2008/0228362 A1 | 9/2008 | Muller et al. | |
| 2011/0153173 A1 * | 6/2011 | Wolfgang et al. | 701/58 |

FOREIGN PATENT DOCUMENTS

| | | |
|---|---|---|
| DE | 44 40 706 A1 | 5/1996 |
| DE | 10 2005 031 764 A1 | 1/2007 |
| EP | 0 864 781 A1 | 9/1998 |
| JP | 05196136 A * | 8/1993 |

* cited by examiner

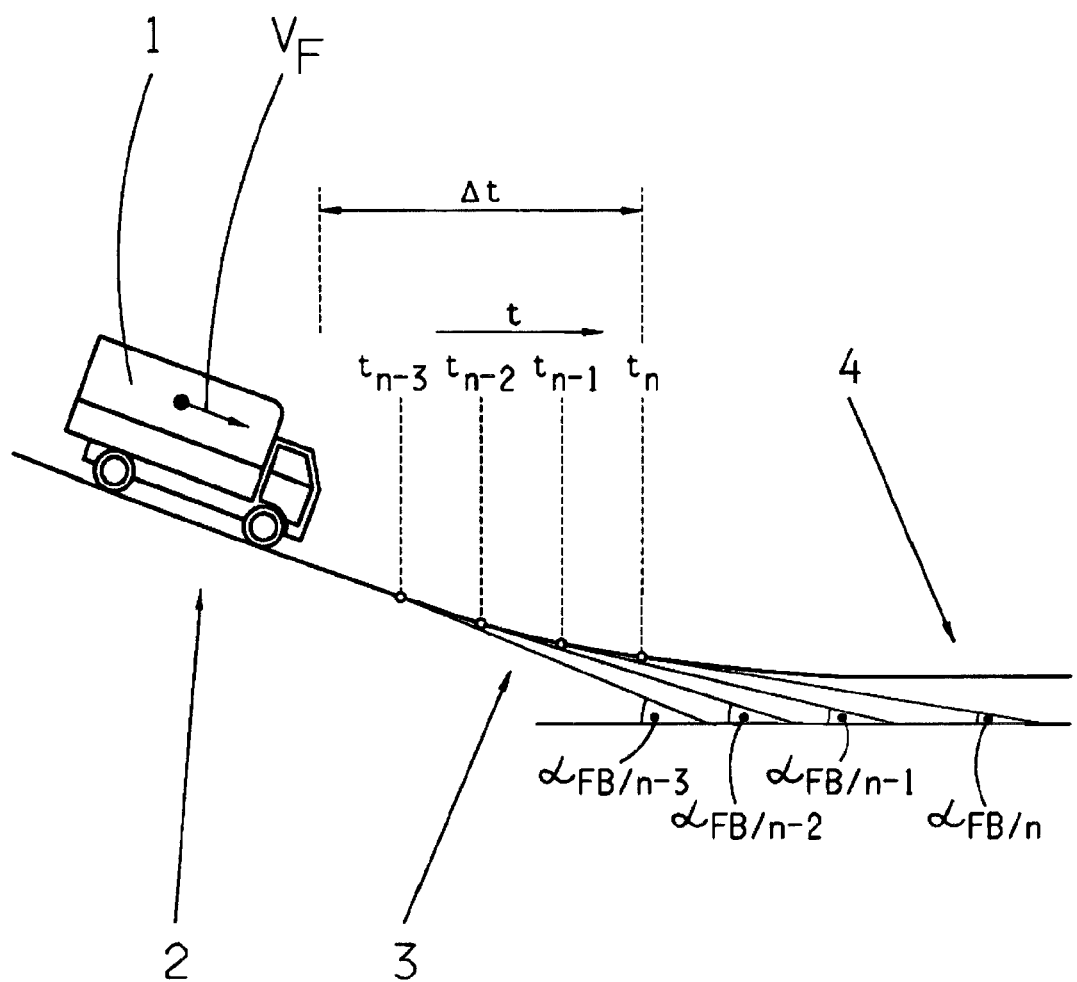

METHOD FOR CONTROLLING AN AUTOMATIC MULTI-STEP SHIFT TRANSMISSION

This application is a National Stage completion of PCT/EP2008/062010 filed Sep. 11, 2008, which claims priority from German patent application serial no. 10 2007 044 432.1 filed Sep. 18, 2007.

FIELD OF THE INVENTION

The invention concerns a method for controlling an automatic multi-step shift transmission arranged in a drivetrain of a motor vehicle, for example a utility vehicle, in the force flow between a drive motor in the form of an internal combustion engine and an axle drive of a drive axle or a transfer box, in which method the current road inclination is determined.

BACKGROUND OF THE INVENTION

In the case of a motor vehicle fitted with an automatic multi-step shift transmission such as an automated change-speed transmission, an automated dual-clutch transmission or a converter automatic transmission, after driving onto a downward-sloping stretch a lower gear is engaged, in order to increase the speed of the drive motor which, after the transition to thrust operation, is operating in a switched-off thrust mode, i.e. without fuel injection. Owing to the higher speed of the drive motor, the drag torque and hence the braking action of the drive motor increase. Furthermore, the braking force produced on the driven wheels by the drag torque of the drive motor is additionally increased due to the higher transmission ratio.

If the motor vehicle has a permanent brake such as an electromagnetic or hydrodynamic retarder, as is usual in heavy utility vehicles, this too is additionally activated when driving on steep and/or longer downhill stretches, this being done manually by the driver or automatically by an electronic control unit. In the case of a permanent brake on the primary side, i.e. one arranged on the input shaft of the multi-step shift transmission, at the higher speed of the drive motor both its braking action and its braking capacity, which is limited by the cooling, increase. In contrast, with a permanent brake arranged on the secondary side, i.e. on the output shaft of the multi-step shift transmission, at the higher speed of the drive motor only its braking capacity increases provided that the cooling of the permanent brake is coupled with the cooling of the drive motor, as is the case for example with a secondary retarder of the type known as an 'intarder', where the oil circuit is coupled with that of the multi-step shift transmission and the cooling water circuit connected, via a heat exchanger, with the oil circuit is coupled with that of the drive motor. A corresponding automatic downshift takes place as a function of appropriate operating parameters such as the road inclination, the mass of the vehicle and the driver's braking intention.

A corresponding transmission control system is known from DE 33 34 718 A1. This transmission control system comprises devices for determining the road inclination (uphill or downhill inclination of the road), the mass of the vehicle, the engine torque, and a constant torque required for driving the motor vehicle without any acceleration. By means of a downhill gear assignment system an optimally adapted gear is assigned to each downhill road gradient, in which the vehicle can drive down the slope at constant travel speed without additional actuation of the service brakes, and in this the use of a permanent brake, if present, is taken into account. A shift to the optimum gear is either recommended to the driver, for example, by means of a corresponding best-gear indication, or initiated automatically. A shift to the optimum gear is prevented if, while driving downhill, the driver actuates the accelerator pedal or if the gradient has just become clearly smaller.

Furthermore, in U.S. Pat. No. 5,231,897 a corresponding control unit for an automatic transmission is known, in which the current driving resistance is calculated from the vehicle's acceleration and the torque of the drive motor. If the current driving resistance exceeds an upper, first limit value, uphill driving is recognized and an upshift is prevented. If the current driving resistance falls below a lower, second limit value, downhill driving is recognized and a downshift is carried out in order to produce a braking action by the drive motor.

In DE 44 40 706 C2 a method for controlling an automatic transmission is proposed, in accordance with which, from the road inclination detected and the road-stretch profile determined, an effective hill factor is determined which is used as an interpolation factor. When uphill driving is recognized the shift characteristics currently used are determined in each case by an interpolation between a shift characteristic for driving on level ground and a shift characteristic for driving on a steep uphill road. If downhill driving is recognized, the shift characteristics currently used are determined by interpolation between a shift characteristic for driving on level ground and a shift characteristic for driving on a steep downhill road.

According to the prior art an upshift only takes place after driving onto level ground or after the transition to traction operation, i.e. when the driver actuates the accelerator pedal or when an active speed regulating unit has automatically switched on the fuel injection of the drive motor. As an exception, an upshift can be carried out automatically when driving on a downhill stretch as a protective shift, if the speed of the drive motor has reached or exceeded a critical upper speed limit, for example if the vehicle has moved onto a very steep downhill stretch or because of a high vehicle mass. The disadvantage of an upshift that takes place only after moving onto level ground or after the transition to traction operation, is that the momentum of the motor vehicle, i.e. the driving force due to the slope, is used only insufficiently when moving off the slope to propel the motor vehicle while it is moving off the slope and at the beginning of the subsequent driving on level ground or on a new uphill stretch. Due to this the thrust operation ends relatively early and fuel injection is switched on again, which results in unnecessarily high fuel consumption. Furthermore owing to the high engine speed caused by the lower gear, the noise level produced by the motor when moving off the slope is disadvantageously high.

SUMMARY OF THE INVENTION

Accordingly, the purpose of the present invention is to indicate a method for controlling an automatic multi-step shift transmission of the type mentioned at the start, by virtue of which the shifting behavior of the multi-step shift transmission during the run-out from a downward slope can be improved in relation to lower fuel consumption and less emission of noise.

According to the characteristics of the principal claim, the invention starts from a method for controlling an automatic multi-step shift transmission, such as an automated change-speed transmission, an automated dual-clutch transmission or a converter automatic transmission, which is arranged within a drivetrain of a motor vehicle in the force flow between a drive motor, in the form of an internal combustion engine, and an axle drive of a drive axle or a transfer box, such that the current road inclination (upward or downward slope of the road) is determined. Furthermore it is provided that at the latest after driving onto the downhill stretch and/or after the transition to thrust operation a recognition function for determining a run-out from downhill movement is started, and when a downhill run-out is recognized, before moving onto level ground and/or before the transition to traction operation, a shift to a higher gear takes place, i.e. a thrust upshift is carried out.

Thus, a thrust upshift is carried out while still driving downhill. In this way the speed of the drive motor and of a primary retarder, if present, are reduced by the transmission ratio interval between the previously engaged lower gear and the currently engaged higher gear. Besides reducing the noise emissions of the drive motor and the multi-step shift transmission, this results in a reduction of the drive motor's drag torque and of the braking torque of the primary retarder. Consequently, as the motor vehicle drives through the downhill run-out it accelerates at least slightly because of the overall smaller braking forces in thrust operation, so that compared with previous control processes the transition to traction operation when it then moves onto level ground takes place substantially later. Due to this, especially when the profile of the stretch of road traveled has frequent changes between hilly and level sections, considerable fuel savings can be achieved. Moreover, thanks to such automatically initiated upshifts, the driver does not have to keep selecting the optimum gear and can therefore concentrate better on observing the traffic situation.

The recognition function for determining a downhill run-out is preferably designed such that within the recognition function, at set points in time ($t_i$, $t_{i+1}$, $t_{i+2}$, ...) the road inclination $\alpha_{FB/i}$ in the driving direction, i.e. the downhill or uphill gradient of the road, is determined and a downhill run-out is considered to have been recognized when, over a specified number of consecutive and immediately previous time points ($t_{n-3}$, $t_{n-2}$, $t_{n-1}$, $t_n$), the absolute numerical value of the downhill road gradient $\alpha_{FB/i}$ determined has been decreasing monotonically ($|\alpha_{FB/i}|<|\alpha_{FB/i-1}|$) and when the absolute numerical value of the current downhill gradient $\alpha_{FB/n}$ determined at the current time point $t_n$ is smaller than a predetermined lower gradient limit value $\alpha_{Gr/u}$ ($|\alpha_{FB/n}|<|\alpha_{Gr/u}|$). the number of time points ($t_{n-3}$, $t_{n-2}$, $t_{n-1}$, $t_n$) required for a reliable determination of a downhill run-out being determined essentially by the length of the time cycles and by the road profile, and if necessary being made variable, i.e. increased or reduced according to need.

The higher gear to which the automatically initiated thrust shift takes place, is expediently determined as a function of the current driving resistance $F_w$ in such manner that the driving acceleration $a_{F/erw}$ to be expected in the gear does not exceed a predetermined acceleration limit value $a_{Gr}$ ($a_{F/erw} \leq a_{Gr}$). This ensures that in the higher gear the motor vehicle does not accelerate to an extent that takes the driver by surprise and may possibly be dangerous, but that it accelerates in a manner that can be safely controlled by actuating the brakes if needs be.

Since the determination of a downhill run-out is comparatively difficult and prone to some uncertainty, for safety reasons it makes sense to prevent the thrust upshift even when a downhill run-out has been recognized if, within a defined and immediately previous time interval $\Delta t$, the actuation of at least one safety-relevant driving control element is detected and/or a predetermined limit value of at least one safety-relevant operating parameter has been exceeded.

Consequently, the thrust upshift is expediently prevented if, within the time interval $\Delta t$ considered, an actuation of the service brake has been detected, which can for example be determined by means of a brake pedal sensor with reference to brake pedal movement $x_{BP}>0$ and/or by means of a brake pressure sensor of the service brake with reference to brake pressure $p_{Br}>0$. By actuating the service brake the driver indicates a wish to slow down the motor vehicle, for example because of corresponding events observed in the surrounding traffic, so that this driver's wish would counteract an acceleration resulting from the thrust upshift provided for as such, and to compensate the smaller braking effect of the drive motor, a correspondingly more powerful actuation of the service brake would be required.

Likewise, the thrust upshift is expediently prevented if, within the time interval $\Delta t$ considered, a positive acceleration $a_F$ of the motor vehicle has been detected ($a_F>0$) or if the acceleration $a_F$ is larger than a specified limit value $a_{grenz}$ ($a_F>a_{grenz}$). If a positive movement acceleration $a_F>0$ is already taking place before a thrust downshift, then it is probable that the service brake has previously been actuated manually or automatically (by the driver or by an activated speed regulating unit), so that carrying out the automatic thrust upshift in this situation is rather to be regarded as disadvantageous.

Furthermore, it is regarded as appropriate for the thrust upshift to be blocked if, within the time interval $\Delta t$ considered, the road gradient $\alpha_{FB}$ determined has exceeded an upper gradient limit value $\alpha_{Gr/o}$. Since in contrast to an uphill road the downhill road gradient is generally defined as a negative road inclination $\alpha_{FB}<0$, in this relation the absolute numerical values have to be considered, and the condition is therefore correctly expressed as: $|\alpha_{FB}|>|\alpha_{Gr/o}|$. Accordingly, if there is a road profile with steeper downhill stretches, then for safety reasons it is expedient to suppress the thrust upshift even when a downhill run-out has been recognized, in order to avoid an immediate thrust upshift that may perhaps take place during the recognized downhill run-out or on a downhill stretch that comes after a subsequent level road section.

For this reason the thrust upshift is also expediently prevented if the vehicle's mass $m_{Fzg}$ has exceeded an upper mass limit $m_{Gr/o}$ ($m_{Fzg}>m_{Gr/o}$), since even when the road inclination $\alpha_{FB}<0$ is relatively small a high vehicle mass $m_{Fzg}$ would perhaps lead to high vehicle acceleration $a_F$ on a downhill stretch following the recognized downhill run-out in the higher gear, which would demand an immediate downshift as a reaction.

The two above-mentioned operating conditions for suppressing the thrust upshift can also be combined, in that the thrust upshift is prevented if the driving resistance F, determined during the time interval $\Delta t$ considered has fallen below a lower (negative) limit value of the resistance $F_{Gr/u}$ ($F_w<F_{Gr/u}$). As is known, a steep downhill road gradient $\alpha_{FB}<0$ and a large vehicle mass $m_{Fzg}$ result in a large downhill driving force and thus to a small, i.e. negative driving resistance $F_W<0$ which propels the motor vehicle, and it is then expedient for the reasons mentioned earlier to suppress the thrust upshift provided for as such.

If a permanent brake such as a primary retarder coupled to the input shaft of the multi-step shift transmission or a secondary retarder coupled to its output shaft is activated, then it is also appropriate to suppress the thrust upshift as a function of the current capacity loading of the permanent brake. Consequently, the thrust upshift is prevented if, when the permanent brake is activated, the current braking torque $M_{DBr}$ of the permanent brake has exceeded an upper limit related to the maximum braking capacity $M_{DBr\_max}$ of the permanent brake (for example 80% of the maximum braking capacity; factor=0.8) ($M_{DBr}>0.8*M_{DBr\_max}$), i.e. the permanent brake is being operated close to its load limit. In this way the speed-dependent braking capacity $M_{DBr\_max}$ of the permanent brake is not reduced by a thrust downshift and if a downhill stretch comes after the recognized downhill run-out, a sufficiently large capacity reserve of the permanent brake is available in case it is necessary to slow down the motor vehicle even more.

For a further safety-relevant reason the thrust upshift can also be prevented despite the recognition of a downhill run-out if, when the speed regulating unit is activated, the travel speed $v_F$ has exceeded the current nominal speed $v_{F\_soll}$ of the speed regulator within the time interval $\Delta t$ considered. In this case there is no steady-state downhill driving, but rather, the regulator, for example by corresponding control of the retarder, adjusts the nominal speed $v_{F\_soll}$ which indicates that the downhill inclination $\alpha_{FB}<0$ is increasing, at least in sections. Consequently, the thrust upshift provided for as such is suppressed for safety reasons.

As a further criterion for suppressing the thrust upshift an operating situation can be considered, in which the motor vehicle concerned is getting close to a motor vehicle driving ahead of it. If an activated distance regulator (ACC=adaptive cruise control) then recognizes that within the time interval $\Delta t$ considered the driving speed $v_{F/a}$ of the motor vehicle in front has fallen below one's own speed $v_F$ ($v_{F/a}<v_F$), the planned thrust upshift is then expediently not carried out, in order to avoid a too rapid and possibly dangerous approach to the motor vehicle driving in front.

BRIEF DESCRIPTION OF THE DRAWING

To clarify the invention, the description of a drawing is attached. In this the single FIGURE shows a schematic representation of the determination of a downhill run-out according to the invention.

DETAILED DESCRIPTION OF THE PREFERRED EMBODIMENTS

In the schematic representation of the sole FIGURE a motor vehicle 1 is driving on a downhill stretch 2 at a speed $v_F$, so that the drive motor is in thrust operation and a retarder, if present, is engaged. At the latest after driving onto the downhill stretch 2 and/or after the transition to thrust operation, a recognition function for determining a downhill run-out 3 between the current downhill stretch 2 and a subsequent stretch of level ground 4 is initiated in an electronic control unit.

Within the recognition function, in a set time cycle $t_i$, $t_{i+1}$, $t_{i+2}$, ... the respective current road gradients $\alpha_{FB/i}$, $\alpha_{FB/i+1}$, $\alpha_{FB/i+2}$, ..., i.e. the downhill or uphill gradients of the road are determined. If then, at a specified number of consecutive and immediately previous time points, in this case for example four time points $t_{n-3}$, $t_{n-2}$, $t_{n-1}$, $t_n$, the road gradient $\alpha_{FB/i}$ determined has been decreasing monotonically in its absolute numerical value, i.e. $|\alpha_{FB/n}|<|\alpha_{FB/n-1}|<|\alpha_{FB/n-2}|<|\alpha_{FB/n-3}|$, and in addition the current road gradient $\alpha_{FB/n}$, determined at the current time point $t_n$ is smaller in its absolute numerical value than a predetermined gradient limit $\alpha_{Gr/u}$, i.e. $|\alpha_{FB/n}|<|\alpha_{Gr/u}|$, then a downhill run-out 3 is considered to have been recognized.

In this case, normally already before driving onto level ground 4 and/or before the transition to traction operation, a shift is made during thrust operation to a higher transmission gear, i.e. a thrust upshift is carried out. This reduces the speed of the drive motor and of a primary retarder, if present, by the transmission ratio interval between the previously engaged lower gear and the then engaged higher gear. Besides reducing noise emissions from the drive motor and the multi-step shift transmission, this also reduces the drag torque of the drive motor and the braking torque of the primary retarder. Consequently, as it moves through the downhill run-out, and because of the overall smaller braking forces in thrust operation, the motor vehicle accelerates at least slightly so the momentum that results from the downhill road gradient $\alpha_{FB}$ is used to propel the motor vehicle during the downhill run-out 3 and at the beginning of the level ground 4. Thus, the transition to traction operation and the associated activation of the drive motor's fuel injection take place later than was previously usual, and this results in appreciable fuel savings particularly when driving along routes with a hilly road profile.

However, if within a defined and immediately previous time interval $\Delta t$ the actuation of at least one safety-relevant driving control element such as the service brakes ($x_{Bp}>0$, $p_{Br}>0$) has been detected and/or a predetermined limit value of at least one safety-relevant operating parameter such as an upper gradient limit value $\alpha_{Gr/o}<0$ has been exceeded by the road gradient $\alpha_{FB/i}<0$ determined ($|\alpha_{FB/i}|>|\alpha_{Gr/o}|$), and/or an upper limit (for example 80%) relating to the maximum braking capacity $M_{DBr\_max}$ of an activated permanent brake has been exceeded by the current braking torque $M_{DBr}$ ($M_{DBr}>0.8*M_{DBr\_max}$), then for safety reasons the thrust upshift provided for as such is prevented, i.e. not carried out, even if a downhill run-out 3 has been recognized.

INDEXES

1 Motor vehicle
2 Downhill stretch
3 Downhill run-out
4 Level ground
$a_F$ Vehicle acceleration
$a_{F/erw}$ Expected acceleration
$a_{Gr}$ Established acceleration limit value
$a_{grenz}$ Acceleration limit value
$F_{Gr/u}$ Lower resistance limit value
$F_w$ Driving resistance
$M_{DBr}$ Braking torque (of a permanent brake)
$M_{DBr\_max}$ Maximum braking capacity (of a permanent brake)
$M_{DBr\_erw}$ Braking performance in the gear expected
$m_{Fzg}$ Mass of the vehicle
$m_{Gr/o}$ Upper mass limit value
$p_{Br}$ Brake pressure
t Time
$t_i$ Time point, time cycle
$t_{i+1}$ Time point, time cycle
$t_{i+2}$ Time point, time cycle
$t_n$ Time point, current time cycle
$t_{n-1}$ Time point, last time cycle
$t_{n-2}$ Time point, second-from-last time cycle
$t_{n-3}$ Time point, third-from-last time cycle
$v_F$ Travel speed (of one's own motor vehicle)
$v_{F\_soll}$ Nominal speed
$v_{F/a}$ Speed (of a motor vehicle driving in front)
$x_{BP}$ Brake pedal deflection
$\alpha_{FB}$ Road inclination
$\alpha_{FB/i}$ Road inclination value
$\alpha_{FB/i-1}$ Road inclination value
$\alpha_{FB/i+1}$ Road inclination value
$\alpha_{FB/i+2}$ Road inclination value
$\alpha_{FB/n}$ Road inclination value
$\alpha_{FB/n-1}$ Road inclination value $\alpha_{FB/n-2}$ Road inclination value
$\alpha_{FB/n-3}$ Road inclination value
$\alpha_{Gr/o}$ Upper downhill gradient limit value
$\alpha_{Gr/u}$ Lower downhill gradient limit value
$\Delta t$ Time Interval

The invention claimed is:

1. A method for controlling an automatic multi-step shift transmission arranged within a drivetrain of a vehicle in the force flow between a drive motor and an axle drive of either a drive axle or a transfer box, in which a current road inclination ($\alpha_{FB}$) is determined, the method comprising the steps of:
    initiating a recognition function for determining a downhill run-out (3) at a latest of after at least one of driving onto a downhill stretch (2) and a transition to thrust operation; and
    shifting to a higher gear during thrust operation, before at least one of driving onto level ground (4) and a transition to a traction operation, when the downhill run-out (3) is recognized.

2. The method according to claim 1, further comprising the step of determining a road inclination ($\alpha_{FB/I}$) in a driving direction within the recognition function, in a fixed time cycle ($t_i, t_{i+1}, t_{i+2}, \ldots$);
    recognizing the downhill run-out if, over a specified number of time points ($t_{n-3}, t_{n-2}, t_{n-1}, t_n$), an absolute numerical value of the determined road inclination ($\alpha_{FB/I}$) decreases monotonically ($|\alpha_{FB/I}|<|\alpha_{FB/I-1}|$) and a current absolute numerical value of the downhill road gradient ($\alpha_{FB/n}$) determined at a current time point ($t_n$) is smaller than a predetermined lower gradient limit value ($\alpha_{Gr/u}$) ($|\alpha_{FB/n}|<|\alpha_{Gr/u}|$).

3. The method according to claim 2, further comprising the step of determining a road inclination ($\alpha_{FB/I}$) in a driving direction within the recognition function, in fixed time cycles ($t_i, t_{i+1}, t_{i+2}, \ldots$) and varying a duration of the time cycles ($t_{n-3}, t_{n-2}, t_{n-1}, t_n$).

4. The method according to claim 1, further comprising the step of determining the higher gear as a function of current driving resistance ($F_W$) such that vehicle acceleration ($a_{F/erw}$) which is expected in that higher gear does not exceed a predetermined acceleration limit value ($a_{Gr}$) ($a_{F/erw} \leq a_{Gr}$).

5. The method according to claim 1, further comprising the step of, when a downhill run-out has been recognized, preventing a thrust upshift if, within a defined immediately previous time interval ($\Delta t$), at least one of actuation of at least one safety-relevant driving control element has been detected and a predetermined limit value of at least one safety-relevant operating parameter is exceeded.

6. The method according to claim 5, further comprising the step of preventing the thrust upshift if actuation of a service brake ($x_{Bp}>0$, $p_{Br}>0$) is detected.

7. The method according to claim 5, further comprising the step of preventing the thrust upshift if one of a positive acceleration ($a_F$) of the vehicle is detected ($a_F>0$) and the positive acceleration ($a_F$) is larger than a specified limit value ($a_{grenz}$) ($a_F>a_{grenz}$).

8. The method according to claim 5, further comprising the step of preventing the thrust upshift if a determined downhill road gradient ($\alpha_{FB}<0$) exceeds an upper gradient limit value ($\alpha_{Gr/o}<0$) ($|\alpha_{FB}|>|\alpha_{Gr/o}|$).

9. The method according to claim 5, further comprising the step of preventing the thrust upshift if a mass of the vehicle ($m_{Fzg}$) exceeds an upper mass limit value ($m_{Gr/o}$) ($m_{Fzg}>m_{Gr/o}$).

10. The method according to claim 5, further comprising the step of preventing the thrust upshift if a driving resistance ($F_w$) falls below a lower resistance limit value ($F_{Gr/u}$) ($F_w<F_{Gr/u}$).

11. The method according to claim 5, further comprising the step of preventing the thrust upshift if, with an activated permanent brake, a current braking torque ($M_{DBr}$) of the permanent brake exceeds an upper limit (0>factor<1) related to a maximum braking capacity $M_{DBr\_max}$ ($M_{DBr}>$factor* $M_{DBr\_max}$).

12. The method according to claim 5, further comprising the step of blocking the thrust upshift if, with an activated permanent brake, a current braking torque ($M_{DBr\_erw}$) of the permanent brake exceeds an upper limit (0>factor<1) related to the maximum braking capacity $M_{DBr\_max}$ ($M_{DBr\_erw}>$factor* $M_{DBr\_max}$).

13. The method according to claim 5, further comprising the step of preventing the thrust upshift if, when a speed regulating unit is activated, a the speed of the vehicle ($v_F$) exceeds a current nominal speed ($v_{F\_soll}$) set by the speed regulating unit ($v_F>v_{F\_soll}$).

14. The method according to claim 5, further comprising the step of preventing the thrust upshift if, when a distance regulator is activated, a driving speed ($v_{F/a}$) determined for another vehicle driving ahead of the vehicle falls below a driving speed ($v_F$) of the vehicle ($v_{F/a}<v_F$).

* * * * *